UNITED STATES PATENT OFFICE.

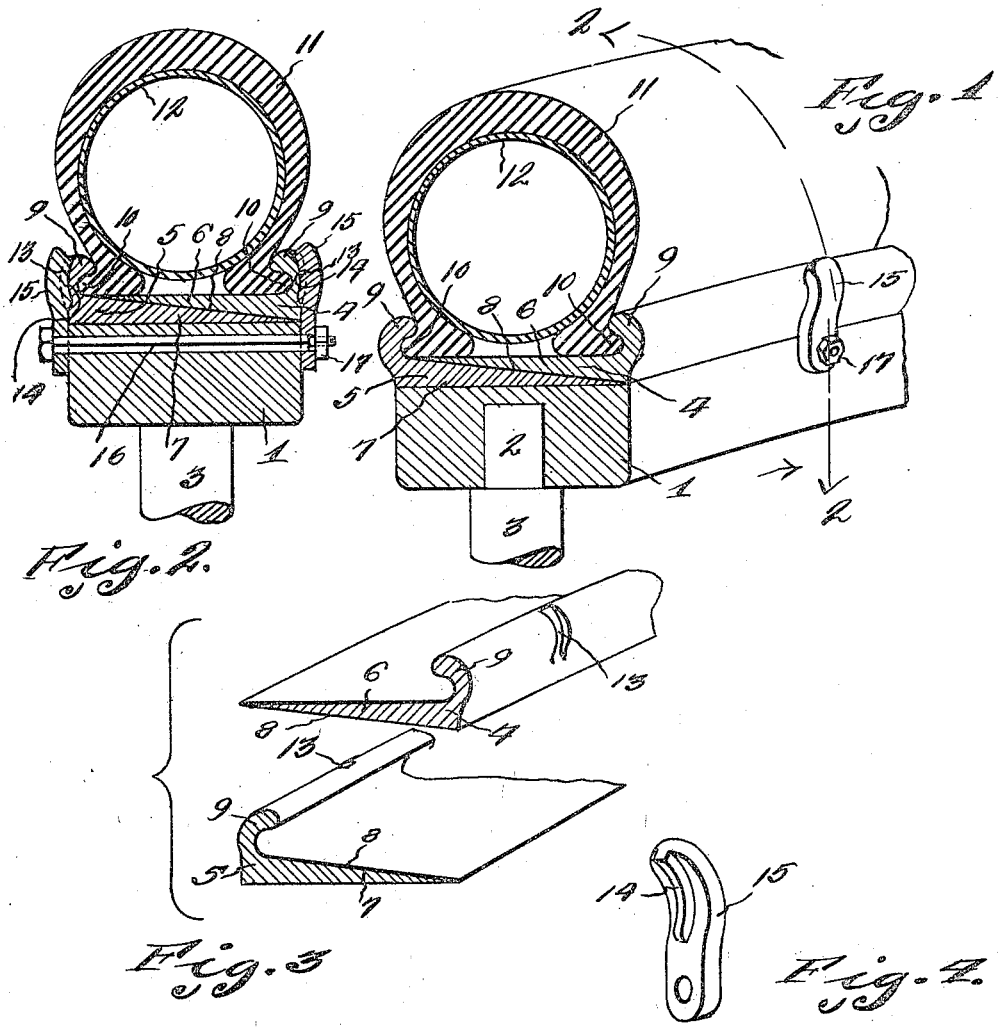

RUSSELL BLAINE KEPP, OF NEOGA, ILLINOIS.

WHEEL-RIM FOR PNEUMATIC TIRES.

1,259,108.  Specification of Letters Patent.  Patented Mar. 12, 1918.

Application filed June 1, 1916. Serial No. 101,079.

*To all whom it may concern:*

Be it known that I, RUSSELL BLAINE KEPP, a citizen of the United States, residing at Neoga, in the county of Cumberland, State of Illinois, have invented a new and useful Wheel-Rim for Pneumatic Tires; and I do hereby declare the following to be a full, clear, and exact description of the invention, such as will enable others skilled in the art to which it appertains to make and use the same.

This invention relates to wheels having pneumatic tires, and particularly to the rim for holding tire in place, and an object of the invention is the provision of a rim of this kind consisting of two sections, each fitted upon the wheel rim proper sidewise and having a clencher flange to hold the tire in place.

Another object of the invention is the provision of means for preventing the two sections of the rim from creeping relative to each other and to the felly.

In practical fields the details of construction may necessitate alterations falling within the scope of what is claimed.

The invention comprises further features and combination of parts as hereinafter set forth shown in the drawings and claimed.

In the drawings:—

Figure 1, is a view in perspective of a felly, showing the tire rim applied and constructed in accordance with the invention.

Fig. 2 is a sectional view on line 2—2 of Fig. 1.

Fig. 3 shows detail perspective view of the two sections of the rim for the tire.

Fig. 4 is a detail view of one of the clamps for holding the tire rim in place.

Referring more especially to the drawing 1 designates the felly, in which the reduced ends 2 of the usual spokes 3 are secured in any suitable manner (not shown). The tire rim consists of the two sections 4 and 5, which are fitted upon the felly 1 laterally or sidewise. The portions 6 and 7 of the sections 4 and 5 are tapering, owing to their adjacent faces 8 being correspondingly inclined or beveled, so that the portion 6 of the section 4 will slide or telescope over the portion 7 of the section 5, as shown in Figs. 1 and 2 clearly. The sections 4 and 5 are provided with the usual overhanging clencher flanges 9, to overlie and engage the flanges 10 of the outer casing 11 of the tire, there being an inner casing 12. The outer side faces of said flanges 9 of the sections 4 and 5 are provided with series of radial recesses or grooves 13, for the reception of correspondingly shaped ribs 14 of the clamps 15, which are secured to the felly 1 by bolts and nuts similar to the bolt and nut 16 and 17 in Fig. 2, which extend transversely of the felly 1. By virtue of the ribs engaging the recess or grooves 13, the creeping of the sections 4 and 5 of the tire rim is prevented, while the clamps prevent lateral movement of the sections. It is to be noted that the bolt 16 is rectangular in cross section, to prevent its turning in the felly, while the openings of the clamp 15 through which the bolt 16 passes are also rectangular, to secure the clamps 15 against movement.

The invention having been set forth what is claimed as new and useful is:—

In a rim securing device for wheels, a felly, a two-part rim thereon provided with opposite tire engaging flanges, the outer faces of said flanges having opposite radial elongated recesses, bolts, each rectangular in cross section and passing transversely of the felly, and with which the recesses radially register said bolts having nuts, clip plates having rectangular openings fitting the rectangular parts of said bolts between the heads and the nuts of said bolts and the felly, said clip plates being shaped corresponding to and engaging said flanges and having their inner adjacent faces provided with radial ribs to engage the radial elongated recesses of said flanges.

In testimony whereof I have signed my name to this specification in the presence of two subscribing witnesses.

RUSSELL BLAINE KEPP.

Witnesses:
OTTO KEPP,
LYMAN HEINDSELMAN.